United States Patent [19]
Eckberg

[11] Patent Number: 4,987,158
[45] Date of Patent: Jan. 22, 1991

[54] UV-CURABLE PRE-CROSSLINKED EPOXY FUNCTIONAL SILICONES

[75] Inventor: Richard P. Eckberg, Saratoga Springs, N.Y.

[73] Assignee: General Electric Company, Waterford, N.Y.

[21] Appl. No.: 498,168

[22] Filed: Mar. 23, 1990

[51] Int. Cl.$^5$ .................... C08G 77/06; C08G 77/04; C08G 77/00
[52] U.S. Cl. .................................... 522/31; 522/170; 528/19; 528/25; 528/43
[58] Field of Search ........................ 522/31, 99, 170; 528/13, 19, 43, 25, 35; 549/215

[56] References Cited

U.S. PATENT DOCUMENTS 3,300,418 1/1967 Andres ................................. 549/215
4,652,662 3/1987 von Au et al. ...................... 549/215

Primary Examiner—Marion C. McCamish
Assistant Examiner—Susan Berman
Attorney, Agent, or Firm—M. A. Montebello

[57] ABSTRACT

UV-cured compositions comprising a precrosslinked epoxy-functional silicone and an onium salt photoinitiator are provided which have improved physical properties as compared to otherwise weak and brittle UV-cured compositions comprising non-precrosslinked epoxy-functional silicones and onium salt photoinitiators without adding fillers and without sacrificing fast, efficient UV cure speed. Such compositions are useful as conformal coatings, optical fiber coatings, and electrical encapsulation.

19 Claims, No Drawings

UV-CURABLE PRE-CROSSLINKED EPOXY FUNCTIONAL SILICONES

Background of the Invention

This invention relates to epoxy-functional organopolysiloxanes. More particularly, this invention relates to pre-crosslinked epoxy-functional organopolysiloxanes and their use as conformal coatings.

UV-curable silicone compositions have become widely accepted as protective coatings for electronic components mounted on circuit boards. The moisture resistance, thermal stability and resistivity of silicones make them ideal for this purpose. The cure chemistry of radiation curable silicones is most often free-radical in nature, requiring a high flux of radicals generated by UV light radiation of photoinitiators.

A drawback to free-radical crosslinking processes is that such processes are subject to inhibition by atmospheric oxygen. The "oxygen effect" is particularly troublesome in oxygen-permeable silicone systems. Prompt cure response, therefore, is dependent on either efficient nitrogen blanketing to forestall oxygen cure inhibition or the use of amine-benzophenone-type synergist catalyst systems to overcome the oxygen effect.

Production ultraviolet facilities are not easily nor economically inerted, particularly if wide web converting or high speed processing is practiced. Furthermore, amine-benzophenone-type synergist catalyst systems useful for overcoming oxygen inhibition in organic acrylate UV cure resins are often insoluble in dimethyl silicone polymers. Fast non-inerted UV cure is achievable by combining mercapto- and acrylated-silicones with certain photosensitizers, but such systems are meta-stable and subject to shelf-life and pot-life limitations.

Currently, UV-curable silicone coatings useful for conformal coatings, optical fiber coatings, and electrical encapsulation contain silicon-bonded mercapto-olefin or acrylate radicals. Reference is made, for example, to U.S. Pat. Nos. 4,558,082; 4,585,669; 4,587,137; 4,496,210; and 4,780,486.

However, the use of mercapto-olefins or acrylates has several drawbacks. For example, acrylates are toxic and both acrylate monomers and mercaptans give off highly offensive odors which can persist in the cured products, and because of precautionary/safety measures entailed by their use, they are not readily adapted to industrial applications.

It is desirable therefore to provide conformal coatings and coatings for optical fibers and electrical encapsulation which are made from UV-curable silicone compositions which do not contain mercapto-olefin or acrylate functionality and which do not cure in a free-radical based crosslinking process.

Cationic (non-radical) UV cure processes are not affected by oxygen and are therefore well suited for high speed silicone coating and curing processes. Cationic UV cure of silicone coatings has been found to be most practical with epoxy-functional silicones.

It would be desirable, therefore, to provide conformal coatings and coatings for optical fibers and electrical encapsulation which are made from UV-curable epoxy-functional silicone compositions.

Epoxysilicone compositions containing epoxy-functionalized silicone polymers and silicone miscible iodonium photocatalysts are presently used as release coatings.

High speed solventless silicone release processing requirements dictate that UV-curable epoxysilicone release compositions be limited to unfilled, low molecular weight, highly organofunctionalized polymers whose cured films are therefore brittle, easily abraded, weak substances unsuited for other coating applications.

Conformal coatings are desired which are tough and have high tensile strength and high percents of elongation but which nonetheless may be UV-cured very rapidly.

Accordingly, it was desirable to provide UV-curable epoxy-functional silicone coatings with improved film properties for use as conformal coatings and coatings for optical fibers and electrical encapsulation.

It was further desirable to provide epoxy-functional silicone coatings with improved film properties without using fillers. Fillers tend to block UV light which consequently slows down cure dramatically. Furthermore, it is difficult to incorporate fillers into low viscosity matrices such as epoxy-functional silicone polymers.

SUMMARY OF THE INVENTION

Accordingly, it is an object of the present invention to provide UV-curable epoxy-functional silicone coatings which combine non-oxygen inhibited fast UV cure with improved film properties for use as conformal coatings and coatings for optical fibers and electrical encapsulation.

It is further object of the present invention to provide UV-curable epoxy-functional silicone coatings with improved film properties without using fillers.

These objects are achieved in the present invention.

The present invention provides an ultraviolet radiation-curable composition, comprising (A) a pre-crosslinked epoxy-functional diorganopolysiloxane having the general formula:

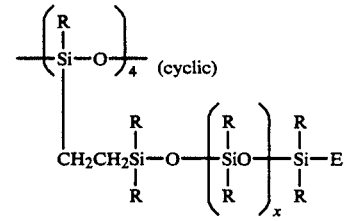

wherein E represents an epoxy-functional organic radical having from 2 to 20 carbon atoms; R is individually a lower alkyl radical having 1 to 8 carbon atoms; and x is a value of from 10 to about 200; and (B) a catalytic amount of an onium salt photocatalyst or a combination of onium salt photocatalysts.

Detailed Description of the Invention

Herein a shorthand system commonly used in the silicone industry will be used to abbreviate silicone structures. Chainstop siloxy units are designated "M", while siloxane units comprising linear polysiloxanes are referred to as "D". Superscripts refer to organic groups other than methyl while subscripts refer to linear polysiloxane chains. Examples of these designations include the following:

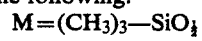

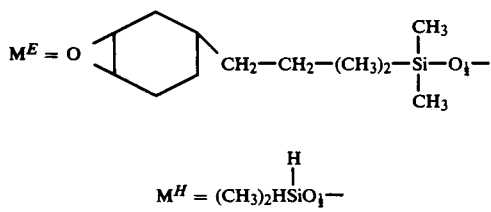

$M^E = $ <image structure: O-cyclohexyl-CH₂—CH₂—(CH₃)₂—Si—O₁/₂— with CH₃ groups>

$M^H = (CH_3)_2HSiO_{\frac{1}{2}}—$

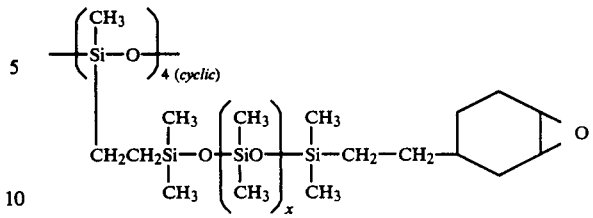

$D = —(CH_3)_2SiO—$

In the examples below, "vi" refers to the vinyl radical, and "Ph" refers to the phenyl radical.

The term "pre-crosslinked" as used herein refers to a partially cross-linked SiH-containing silicone structure prepared by reaction of a stoichiometric excess of dimethyl-hydrogensiloxy-chainstopped polydimethylsiloxane with tetramethyltetravinylcyclotet (sometimes referred to herein as "$D_4^{vi}$").

In principal, pre-crosslinked silicones of this kind can be obtained by reaction of a stoichiometric excess of sym-tetramethylcyclotetrasiloxane ($D_4^H$) with dimethylvinylsiloxy chainstopped polydimethylsiloxane. In practice, it has been found that the pre-crosslinking reaction and subsequent formation of the epoxy-functional UV-curable polymer is more facile $D_4^{vi}$ is used rather than $D_4^H$. The stepwise synthesis of these pre-crosslinked epoxysilicones may be represented in this fashion:

$$n\ M^H D_x M^H + D_4^{vi} \xrightarrow{\text{catalyst}}$$

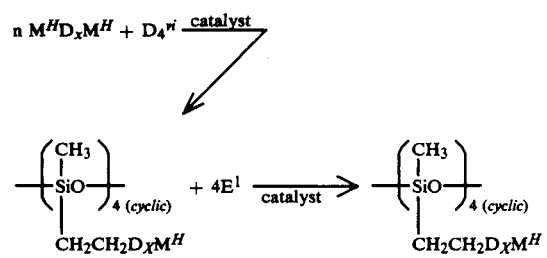

In formula (I) above for the pre-crosslinked polymer of component (A), R is a lower alkyl radical having 1 to about 8 carbon atoms, and preferably a methyl group. x is a value of from about 10 to about 200, preferably about 40 to about 100, and most preferably about 50 to about 100. $E^1$ is an organic monomer possessing both olefin and epoxy functionalities and $n \geq 4$. E is an epoxy-functional organic radical having from 2 to 20 carbon atoms. Preferably, E is derived from 4-vinylcyclohexeneoxide and has the formula:

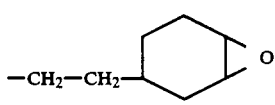

Thus, in preferred embodiments of this invention, the polymer of component (A) has the formula:

wherein x is about 50 to about 100.

The catalyst used in step (1) of the process above is a platinum metal catalyst effective for adding hydrogen to the double bond of the vinyl group. Ordinarily, approximately 5 parts platinum metal per million parts of siloxane will be effective to promote this hydrosilation reaction. Examples are those exemplified in U.S. Pat. Nos. 3,220,972; 3,814,730; 3,775,452; and 3,715,334, each of which is herein incorporated by reference. Particularly useful are those platinum catalysts derived from chloroplatinic acid which has been treated with tetramethyldivinyldisiloxane, as described in U.S. Pat. No. 3,814,730 to Karstedt (hereinafter referred to as the "Karstedt catalyst".), which is incorporated herein by reference.

Suitable epoxy compounds for use in step (2) of the process above include olefinic epoxy monomers such as limoneneoxide, 4-vinylcyclohexeneoxide, allylglycidylether, 7-epoxy-1-octene, and the like. Because their cationic cure response is much faster than that of their glycidyl ether analogs, olefinic-cycloaliphatic epoxides are preferred for use in the present invention. The preferred olefinic-cycloaliphatic epoxide is 4-vinylcyclohexeneoxide.

Component B of the composition of this invention is an onium salt photoinitiator. Suitable photoinitiators are the onium salts having the formulae:

$R_2I^+MX_n$
$R_3S^+MX_n—$
$R_3Se^+MX_n—$
$R_4P^+MX_n—$
$R_4N^+MX_n—$ where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, and the like, and also including aromatic heterocyclic radicals including, e.g., pyridyl, thiophenyl, pyranyl, and the like; and $MX_n—$ is a non-basic, non-nucleophilic anion, such as $BF_4—$, $PF_6—$, $AsF_6—$, $SbF_6—$, $SbCl_6—$, $HSO_4—$, $ClO_4—$, and the like.

The preferred onium salts for use herein are the diaryliodonium salts. Examples of suitable diaryliodonium salts are disclosed, for example, in U.S. Pat. No. 4,882,201, which is incorporated herein by reference. The most preferred of these salts is that having the formula

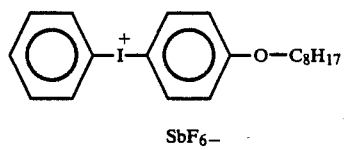

SbF6−

Examples of specific preferred bis-diaryl iodonium salts include, for example, bis(dodecyl phenyl)iodonium hexafluoroarsenate, and bis(dodecyl phenyl) iodonium hexafluoroantimonate, are preferred. Most preferred of these iodonium salts is bis(dodecyl phenyl) iodonium hexafluoroantimonate.

The amount of catalyst present in the composition of this invention is not critical, so long as proper polymerization is effected. As with any catalyst, it is preferable to use the smallest effective amount possible; for the purposes herein, catalyst levels of from about 0.5%–5.0% by weight have been found suitable.

In formula (I) above, x is generally about 10 to about 200. In order to obtain improved physical properties, the value of x must be at least about 50 and preferably about 50 to about 100. However, x values of 10 up to 50 will provide acceptable physical properties, i.e., tensile strength of at least 30 psi and elongation of at least 15% along with the benefit of extraordinarily fast UV cure response. From the standpoint of achieving faster UV cure and acceptable physical properties, x is preferably in the range of about 10 to about 40.

The curable compositions are prepared merely by combining the various ingredients. The articles of the present invention are prepared by applying such composition to a substrate such as a circuit board if the composition is to be used as a conformal coating, thereafter exposing the coated substrate to ultraviolet radiation sufficient to set the composition, and finally allowing curing to be completed by exposing the article to either room temperature, elevated temperature, or further UV light radiation.

Another aspect of the present invention is directed to the method of making the UV curable composition of the present invention, comprising the step of mixing components A and B. A further aspect is directed to an article of manufacture, comprising a substrate having disposed on the surface thereof a coating containing the cured composition comprising components (A) and (B).

In order that those skilled in the art might be better able to practice the present invention, the following examples are given by way of illustration and not by way of limitation.

Experimental

EXAMPLE 1

423 grams of a dimethylhydrogensiloxy-chainstopped linear polydimethylsiloxane, represented as $M^H D_{47} M^H$ containing 550 ppm H, were weighed into a 2 l RB flask. 0.233 moles of active SiH were, therefore, present. 200 grams hexane +0.05 grams Karstedt platinum catalyst were then added. This agitating mixture was brought to 62° C., when a solution of 10 grams sym-tetramethyl-tetravinylcyclotetrasiloxane ($D_4^{vi}$) in 200 grams hexane was slowly added dropwise. This solution contained 0.116 moles of Si-vinyl. The complete reaction mixture was maintained at 60° C. for 16 hours which agitating. An infrared spectrum of the reaction mixture included a very small vinyl stretch at 1600 cm$^{-1}$ (compared to a blank which was made up of an identical solution without platinum catalyst) and the large SiH stretch at 2200 cm$^{-1}$. 14.5 grams VCHO (0.117 moles) were added, the mixture held at 62° C. for 3 hours, at which time all SiH was consumed. Solvent was removed in vacuo at 135° C., leaving 442 grams of a viscous clear fluid product, 4240 cps. viscosity (Brookfield LVF #3, 12 rpm). $N_D^{25} = 1.4091$. The epoxy equivalent weight of this material, based on total charge to the flask, was about 3800.

Since the polymer is partially crosslinked even before being UV-cured, a small amount of epoxy polymerization is sufficient to completely cure the coating.

In the examples below, "n" refers to the molar ratio of $M^H D_x M^H$ to $D_4^{vi}$.

EXAMPLE 2

194 g of $M^H D_{47} M^H$, containing 0.107 moles H, were weighed into a 1 l RB flask with 0.1 g of the Karstedt catalyst. The batch was brought to 72° C., then a solution of 2.30 g $D_4^{Vi}$ (0.02675 moles Vi) in 100 g hexane was added. In this example, n = 8. After 90 minutes hold at 70°, no vinyl was detected by FTIR analysis.

10.0 g 4-vinylcyclohexenoxide (0.08 moles) were then added, and the complete reaction mixture maintained at 66° C. for 30 minutes, after which no SiH was detectable by FTIR. Hexane, excess VCHO, and stray siloxane volatiles were removed by vacuum strip at 140° C. Final product yield was 170g of a clear 187 cstk fluid with $N_D^{24} = 1.4106$.

EXAMPLE 3

Example 1 was repeated except that $M^H D_{100} M^H$ fluid was substituted for $M^H D_{47} M^H$, and n=4.

EXAMPLE 4

Example 2 was repeated except that n=8.

EXAMPLE 5

Example 1 was repeated except that $M^H D_{40} M^H$ was substituted for $M^H D_{47} M^H$, with n=4.

EXAMPLE 6

Example 1 was repeated substituting $M^H D_{22} M^H$ for $M^H D_{47} M^H$, with n=4.

The products prepared in the examples above were characterized by viscosity, refractive index, and infrared spectra. UV cure and physical property characterizations were carried out in the following fashion: 1.0 wt % of a 50% wt/wt solution of bis(dodecylphenyl) iodoniumhexafluoroantimonate in 2-ethyl-1,3-hexanediol was mixed with each of the 4 compositions. 2 mil thick coatings of the photocatalyzed mixtures were manually applied to polyethylene kraft substrates, and the minimum ultraviolet light flux required to convert the liquid coatings to smear- and migration-free solid surfaces ascertained by manipulation of lamp power and conveyer speed of an RPC model 1202QC Lab Processor unit (equipped with two Hanovia medium pressure mercury vapor UV lamps) into which the coated samples were placed. UV flux was measured with an International Light, Model 700A Research Photometer equipped with a Model A309 Lightbug accessory.

Properties of the products prepared in Examples 1-6 are summarized in Table 1 below.

TABLE 1

| Example Number | n | x | Viscosity | $N_D^{25}$ | EEW* |
|---|---|---|---|---|---|
| 1 | 4 | 47 | 4240 cps | 1.4091 | 4317 |
| 2 | 8 | 47 | 187 cstk | 1.4106 | 2580 |
| 3 | 4 | 100 | 11000 cps | 1.4065 | 7750 |
| 4 | 8 | 100 | 760 cstk | 1.4072 | 5190 |
| 5 | 4 | 40 | 6300 cps | 1.4111 | 3290 |
| 6 | 4 | 22 | 642 cstk | 1.4158 | 1950 |

*Calculated epoxy equivalent weight.

Peak elongation and tensile strengths of thick (50 mil) UV-cured sections were determined as follows: thick slabs of the coating compositions prepared in the examples above were prepared by weighing 15.0 grams of catalyzed baths into 12 cm-diameter shallow aluminum pans, then exposing the coating to @2.2 J/cm² focused UV light on the top side, removing the cured slabs from the mold, then exposing the tacky bottom sides to @1.1 J/cm² UV flux Cured sections were about 50 mils thick. Standard ASTM tensile bars were cut from the slabs, with peak tensile strength and elongation determined using an Instron testing device.

The UV flux, tensile and elongation results are shown in Table 2 below.

TABLE 2

| Example Number | UV Flux for 2 mil Cure | Peak Tensile | Peak Elongation |
|---|---|---|---|
| 1 | 32 mJ/cm² | 174 psi | 25.5% |
| 2 | 100 | 186 | 15% |
| 3 | 93 | 206 | 106% |
| 4 | 203 | 210 | 20% |
| 5 | 28 | 46 | 17% |
| 6 | 19.5 | 38 | 14 |

COMPARATIVE EXAMPLE A

A control experiment was carried out by simple VCHO addition to $M^H D_{100} M^H$, providing an epoxy-stopped non-precrosslinked linear silicone polymer ($M^E D_{100} M^e$) having 215 cstk viscosity, $N_D^{25} = 1.4074$, and EEW =3891.

2 mil films of this catalyzed control material required 830 mJ/cm² to cure, several times more than its 'pre-crosslinked' analogs despite the higher oxirane content of the control material. Peak tensile measured for a 50 mil film of Comparative Example A was 44 psi at a peak elongation of 85%.

The examples above illustrate that the pre-cross-linked epoxy silicone composition of the present invention has a faster cure response and better tensile and elongation properties than non-precrosslinked epox-ysilicones with identical epoxy equivalent weight. The improved cure response and properties of the precross-linked epoxy silicones is a result of its structure. Because the precrosslinked polymer is partially cross-linked before being UV cured, a small amount of epoxy polymerization is sufficient to completely cure the coating. The examples further show that reduced values of x enhance cure speed and decrease viscosity, but do so at the expense of ultimate tensile properties of the UV-cured films.

What is claimed is:

1. An ultraviolet radiation-curable composition, comprising
   (A) a pre-crosslinked epoxy-functional diorganopolysiloxane having the general formula:

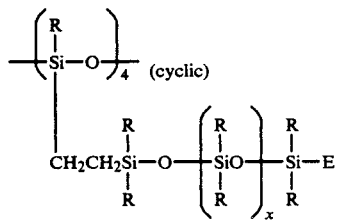

wherein E represents an epoxy-functional organic radical having from 2 to 20 carbon atoms; R is individually a lower alkyl radical having 1 to 8 carbon atoms; and x is a value of from 10 to about 200; and
   (B) a catalytic amount of an onium salt photocatalyst or a combination of onium salt photocatalysts.

2. The composition of claim 1 wherein R is a methyl group.

3. The composition of claim 1 wherein E is derived from 4-vinylcyclohexeneoxide and has the formula:

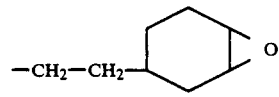

4. The composition of claim 1 wherein x is a number in the range of about 40 to about 100.

5. The composition of claim 4 wherein x is a number in the range of about 50 to about 100.

6. The composition of claim 1 wherein x is a number in the range of about 10 to about 40.

7. The composition of claim 1 wherein component (B) is present in an amount in the range of about 0.5% to about 5.0%.

8. The composition of claim 1 wherein component (B) is a diaryliodonium salt.

9. The composition of claim 8 wherein component (B) has the formula

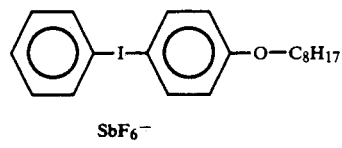

10. The composition of claim 8 wherein component (B) is bis(dodecyl phenyl) iodonium hexafluoroantimonate.

11. An ultraviolet radiation-curable composition, comprising
   (A) a pre-crosslinked epoxy-functional dimethylpolysiloxane having the general formula:

I.

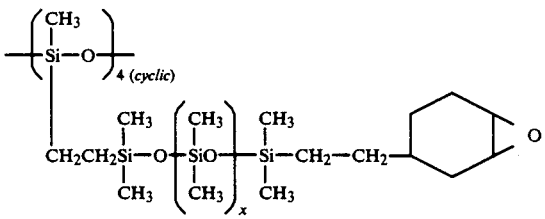

wherein x is about 50 to about 100.
and (B) about 0.5% to about 5.0% of bis(dodecylphenyl)iodonium hexafluoroantimonate or of a diaryliodonium salt having the formula:

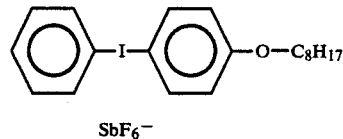

SbF$_6^-$

12. A method for making a UV-curable composition, comprising mixing (A) a pre-crosslinked epoxy-functional diorganopolysiloxane having the general formula:

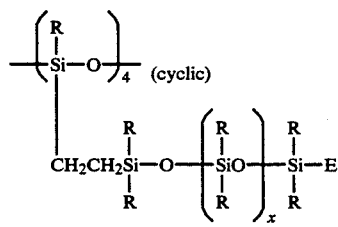

wherein E represents an epoxy-functional organic radical having from 2 to 20 carbon atoms; R is individually a lower alkyl radical having 1 to 8 carbon atoms; and x is a value of from 10 to about 200; and (B) a catalytic amount of an onium salt photocatalyst or a combination of onium salt photocatalysts.

13. The method of claim 12 wherein R is a methyl group.

14. The method of claim 12 wherein E is derived from 4-vinylcyclohexeneoxide and has the formula:

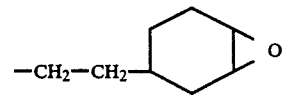

15. The method of claim 12 wherein x is a number in the range of about 50 to about 100.

16. The method of claim 12 wherein x is a number in the range of about 10 to about 40.

17. The method of claim 12 wherein component (B) is present in an amount in the range of about 0.5% to about 5.0%.

18. The method of claim 12 wherein component (B) is bis(dodecyl phenyl) iodonium hexafluoroantimonate.

19. A method for making a UV-curable composition, comprising mixing (A) a pre-crosslinked epoxy-functional dimethylpolysiloxane having the general formula:

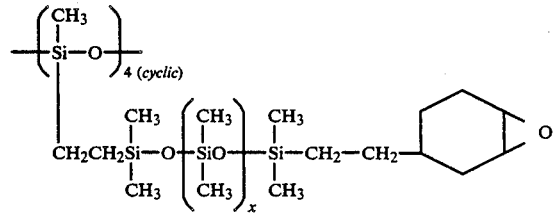

wherein x is about 50 to about 100.
and (B) about 0.5% to about 5 0% of bis(dodecylphenyl)iodonium hexafluoroantimonate or of a diaryliodonium salt having the formula:

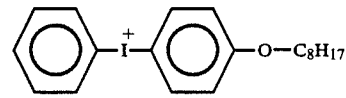

SbF$_6-$

* * * * *